United States Patent
Gao et al.

(10) Patent No.: US 8,040,793 B2
(45) Date of Patent: Oct. 18, 2011

(54) METHOD, SYSTEM AND DEVICE FOR PROCESSING FAILURE

(75) Inventors: Jianhua Gao, Shenzhen (CN); Dan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 12/331,125

(22) Filed: Dec. 9, 2008

(65) Prior Publication Data

US 2009/0086623 A1 Apr. 2, 2009

Related U.S. Application Data

(63) Continuation of application No. PCT/CN2007/001194, filed on Apr. 12, 2007.

(30) Foreign Application Priority Data

Jun. 9, 2006 (CN) .......................... 2006 1 0092914

(51) Int. Cl.
G06F 11/00 (2006.01)
H04L 12/26 (2006.01)
H04L 12/28 (2006.01)

(52) U.S. Cl. .................... 370/218; 370/252; 370/255

(58) Field of Classification Search ............. 370/216, 370/217, 218, 254, 255
See application file for complete search history.

(56) References Cited

U.S. PATENT DOCUMENTS

| | | | | |
|---|---|---|---|---|
| 6,950,427 B1 * | 9/2005 | Zinin | ............................ | 370/386 |
| 7,248,579 B1 * | 7/2007 | Friedman | ..................... | 370/389 |
| 7,639,680 B1 * | 12/2009 | Roy et al. | ..................... | 370/389 |
| 7,680,028 B1 * | 3/2010 | Zamfir et al. | ................. | 370/216 |
| 7,830,786 B2 * | 11/2010 | Atlas et al. | ..................... | 370/217 |
| 7,881,184 B2 * | 2/2011 | Owens et al. | ................. | 370/216 |
| 7,940,647 B2 * | 5/2011 | Zhang | ............................ | 370/217 |
| 7,969,865 B2 * | 6/2011 | Nonaka | ........................ | 370/216 |
| 7,969,866 B2 * | 6/2011 | Khan et al. | ..................... | 370/216 |

(Continued)

FOREIGN PATENT DOCUMENTS

CN 1492601 A 4/2004

(Continued)

OTHER PUBLICATIONS

European Patent Office, Examination Report in European Application No. 07720767.8 (May 18, 2010).

(Continued)

*Primary Examiner* — Warner Wong
(74) *Attorney, Agent, or Firm* — Leydig, Voit & Mayer, Ltd.

(57) ABSTRACT

A method, a system, and a device for processing failure is provided; the method is applicable to a label switched path (LSP) including a first node, a second node, and at least one third node. The first node and the second node are adjacent nodes suffering communication breakdown. The first node restarts. The third node is a normal node closest to the restarted first node. When the communication between the first node and the second node is broken, the third node maintains control state information of the LSP in certain time. When the communication between the first node and the second node is recovered in the certain time, the first node, the second node, and the third node recover the control state information of the LSP. A failure processing system and a device on LSP are further provided. Therefore, when several nodes on the LSP suffer communication failures, the LSP can be reliably recovered.

13 Claims, 8 Drawing Sheets

U.S. PATENT DOCUMENTS

| | | | |
|---|---|---|---|
| 7,978,594 B2 * | 7/2011 | Kodialam et al. | 370/216 |
| 2002/0181409 A1 * | 12/2002 | Shen | 370/252 |
| 2003/0169684 A1 * | 9/2003 | Yamanaka et al. | 370/216 |
| 2003/0193890 A1 * | 10/2003 | Tsillas et al. | 370/216 |
| 2005/0170438 A1 * | 8/2005 | Chan-Hui et al. | 435/7.2 |
| 2005/0259570 A1 | 11/2005 | Hayashi et al. | |
| 2006/0013127 A1 * | 1/2006 | Izaiku et al. | 370/225 |
| 2006/0159009 A1 * | 7/2006 | Kim et al. | 370/216 |
| 2006/0250951 A1 * | 11/2006 | Ueda et al. | 370/217 |
| 2007/0053359 A1 * | 3/2007 | Wu et al. | 370/392 |
| 2007/0280140 A1 * | 12/2007 | Venketesan et al. | 370/254 |

FOREIGN PATENT DOCUMENTS

| | | |
|---|---|---|
| CN | 1567844 A | 1/2005 |
| CN | 1567844 K1 | 1/2005 |
| CN | 1801802 A | 7/2006 |

OTHER PUBLICATIONS

Awduche et al., "RSVP-TE: Extensions to RSVP for LSP Tunnels," *IETF Standard*, Internet Engineering Task Force, 1-61 (Dec. 1, 2001) rfc3209.txt.

Berger et al., "Generalized Multi-Protocol Label Switching (GMPLS) Signaling Resource Reservation Protocol-Traffic Engineering (RSVP-TE) Extensions," *IETF Standard, Internet Engineering Task Force*, 1-42 (Jan. 1, 2003) rfc3473.txt.

Satyanarayan et al., "Extensions to GMPLS RSVP Graceful Restart," *IETF Standard-Working-Draft, Internet Engineering Task Force*, ccamp(5): 1-24 (Oct. 1, 2005) draft-ietf-ccamp-rsvp-restart-ext-05.txt.

Weilian et al., "Mechanism of Multiple Adjacent Nodes RSVP Graceful Restart Simultaneously," *IETF Standard-Working-Draft, Internet Engineering Task Force*, 1-11 (Nov. 20, 2005) draft-jian-ccamp-multinodes-rsvp-restart-00.txt.

European Patent Office, Second Examination Report in European Patent Application No. 07720767.8 (Mar. 19, 2009).

State Intellectual Property Office of the People's Republic of China, First Examination Report in Chinese Patent Application No. 200610092914.0 (Feb. 6, 2009).

State Intellectual Property Office of the People's Republic of China, Written Opinion of the International Searching Authority in International Patent Application No. PCTCN2007/001194 (Jul. 26, 2007).

Tempest et al., "RSVP-TE failure recovery (resynchronization after failure)," The Internet Society, Internet Engineering Task Force, Internet Draft, 1-10 (Jul. 2001).

Braden et al., "RFC 2205—Resource ReSerVation Protocol (RSVP)—Version 1 Functional Specification," Sep. 1997, Network Working Group, Geneva, Switzerland.

* cited by examiner

US 8,040,793 B2

METHOD, SYSTEM AND DEVICE FOR PROCESSING FAILURE

CROSS-REFERENCE TO RELATED APPLICATIONS

This application is a continuation of International Patent Application No. PCT/CN2007/001194, filed Apr. 12, 2007, which claims priority to Chinese Patent Application No. 200610092914.0, filed Jun. 9, 2006, each of which is hereby incorporated by reference in its entirety.

FIELD OF THE INVENTION

The present invention relates to generalized multi-protocol label switching (GMPLS) technology, and more particularly, to a method, a system, and a device for processing failure in GMPLS technology.

BACKGROUND

At present, under the double driving of bandwidth requirements caused by rapid increase of Internet Protocol (IP) services and innovative bandwidth utilization modes induced by the wavelength division multiplexing technology, IP service requires the realization of dynamic allocation of network bandwidth due to its emergency and uncertainty. It is difficult for a conventional static optical transmission network to satisfy the requirements of dynamic allocation, and an intelligent optical network thus emerges. The intelligent optical network directly introduces an intelligent control technology based on IP into an optical network, thereby efficiently supporting dynamic establishment and removal of a connection, reasonably allocating network resources on demand based on traffic engineering, and providing good network protection/recovery performance.

The intelligent optical network introduces a generalized multi-protocol label switching (GMPLS) control plane, thereby endowing a failed network with strong surviving capability, realizing dynamic application, release, and reconfiguration of bandwidth, simplifying network management, and providing new value-added services. The most serious challenges are stability and security problems when an IP-based GMPLS signaling protocol is applied in telecommunication and optical transmission network. In order to protect, to the utmost extent, services from being interrupted, any failure occurred in the control plane should not influence and interrupt services that have been established by a transmission plane. In practical application, no matter whether the control plane has one or several continuously failed control nodes, the network must be good at isolating and recovering the failures of the control plane. After one or several continuous control nodes fail and are recovered, the services established before failures may be recovered normally in a signaling state regarding the control nodes.

Regarding communication failure processing of nodes, the Request for Comments 3473 of the Internet Engineering Task Force (IETF RFC) defines a Resource Reservation Protocol-Traffic Engineering (RSVP-TE) to perform recovering operation on the restart of the node in the control plane.

FIG. 1 is a flow chart of an existing method for processing node restart. As shown in FIG. 1, the method includes the following steps.

In Step 101, a node A cannot receive a HELLO message from a node B when the node B powers off.

The nodes A and B are two nodes in a GMPLS control plane. The nodes A and B may inform each other of the operating state of the control plane software by sending a HELLO message to each other when they are both in a normal state, and refresh control state information in the two nodes by periodically sending a refresh message to each other. The node B which powers off cannot send the HELLO message to the node A.

In Step 102, the node A starts a Restart_Timer and performs a self-refresh.

When a label switched path (LSP) passing through both the nodes A and B exists, node A starts its own Restart_Timer after determining that itself cannot receive the HELLO message from the node B. After that, the node A stops periodically sending the refresh message corresponding to the LSP to the node B, but realizes self-refresh process through keeping LSP-related control state information. In other words, although not receiving the periodic refresh message from the adjacent node B, the node A still keeps the control state information corresponding to the LSP in a counting period of the Restart_Timer. The node A deletes the unrefreshed LSP if not receiving the refresh message from the adjacent node after the Restart_Timer times out.

More specifically, every node on a normally operating LSP receives a Path message from an upstream node and a RESV message from a downstream node. Every node establishes a path state block (PSB) and a reservation state block (RSB) with regard to the LSP, for preserving the control state information carried in the Path message and the RESV message, respectively, such as label values, bandwidth values, and LSP routing information. A node, according to the information in its own PSB, sends the Path message to its downstream adjacent node, and, according to the information in the RSB, sends the RESV message to its upstream adjacent node. Since the node which powers off can neither send the RESV message to its upstream adjacent node, nor send the Path message to its downstream adjacent node, the RSB in the upstream adjacent node cannot be refreshed periodically, i.e., the node A performs the self-refresh process on its own RSB relating to the node B.

In Step 103, the node A continually sends the HELLO message to the node B, and requests the node B to reply.

In Steps 104-105, the node B powers up and restarts, starts a Recovery_Timer, and sends the HELLO message to the node A to indicate that the node B has restarted.

The Recovery_Timer in the node B has the following functions. The node B requires its adjacent node to finish the recovery of the control state information of the LSPs passing through the nodes B and A before timeout of the Recovery_Timer. After the timeout of the Recovery_Timer, the node B deletes the LSPs which are not recovered.

The HELLO message usually includes cells such as a src-instance and a dst-instance. The src-instance has a uniform constant filled therein, and the uniform constant is a constant of the node that sends the HELLO message and runs in a normally operating state. The constant may be preserved in the situation that a node powers off, and the preserved power-off value plus 1 after the node restarts. The dst-instance has a src-instance value filled therein, the src-instance value is included in the latest HELLO message received from the opposite node. If the HELLO message from the opposite node has not been received, or the restarted node sends the HELLO message for the first time, the value in the cell is 0.

After the node powers off and restarts, the src-instance value in the HELLO message from the node is the value, before restart, plus 1, and the dst-instance value is 0. When the node itself operates normally, but a communication link between the nodes is, the src-instance value in the HELLO message sent by the node is equal to the value before the communication link breaks down, and the dst-instance value is 0. The node receiving the HELLO message, according to various combinations of the src-instance value and the dst-instance value carried in the message, determines whether the adjacent node restarts or merely communication link breakdown occurs.

In Steps 106-107, the node A stops the Restart_Timer, stops self-refreshing the control state information relating to the LSPs passing through the nodes A and B, and sends a Path message having a Recovery_label to the node B.

After the node A, according to the HELLO message from the node B, determines that the node B restarts, the node A begins recovery operation on the LSPs passing through the nodes A and B through the Path messages, according to the control state information in its own PSB. Each LSP corresponds to one Path message.

In Steps 108-109, the node B returns an ACK message replying the Path message to the node A, which indicates that the node B has received the Path message from the node A. Furthermore, the node B performs the recovery operation on the control state information relating to the LSP, according to the received Path message.

Since the control state information in the PSB has lost as the node B powers off, the node B creates a corresponding PSB after receiving the Path message from the node A, and records the control state information in the upstream direction which contained in the Path message into the PSB. In addition, if the LSP passing through the node B still has a downstream node, the node B sends the Path message to the downstream node, and the downstream node also sends a RESV message to the node B. After receiving the RESV message, the node B creates a corresponding RSB, and records the control state information in the RESV message. The establishment in the PSB and RSB in the node B represents the end of recovery of the corresponding LSP.

In Step 110, the Recovery_Timer times out, and the node B deletes the LSPs that are not recovered.

After the Recovery_Timer in the node B stops counting, if the node B still has LSPs having control state information not recovered, the LSPs will be deleted.

So far, the flow of processing node restart ends.

The aforementioned flow aims at single node restart. When one LSP has several continuous restarted nodes, the LSP will be deleted if the aforementioned flow is adopted.

Specifically, it is assumed that a LSP passing through the nodes A, B, C, and D in sequence is provided, the nodes B and C power off, the upstream node B restarts firstly, and the downstream node C needs a long time to restart. After the node B restarts, the node A, according to the HELLO message from the node B, determines that the node B restarts, and sends a Path message to the node B. The node B, according to the Path message from the node A, recovers a corresponding PSB. However, since the node C has not restarted yet, the node B cannot receive a RESV message from the node C and cannot recover the RSB, thereby failing to send the RESV message to the node A to refresh the RSB in the node A. As a result, the node A has stopped self-refresh process after receiving the HELLO message from the node B again. If the node A has not received the RESV refresh message from the node B for a long time, the node A deletes the RSB corresponding to the node A. Then, the node A sends a Path_Tear message to the node B to notify the node B to delete the local PSB, thereby causing the deletion of the LSP corresponding to the node B.

If the nodes B and C on the LSP passing through the nodes A, B, C, and D in sequence power off, the downstream node C restarts firstly, and the upstream node B needs a long time to restart, the node C, after restarting, cannot receive the Path message from the node B. Therefore, the PSB on the node C cannot be recovered. The node D stops the self-refresh process on the PSB after receiving the HELLO message from the node C, and then the PSB on the node D is deleted because the node D cannot receive the Path message from the node C for a long time to cause timeout. Furthermore, after the timer corresponding to the RSB of the node D times out, the node D will send a message Resv_Tear to the node C to notify the node C to delete the local RSB, thereby causing the deletion of the LSP corresponding to the node C.

Therefore, the existing method for processing node restart in the prior art cannot recover the LSP reliably when several continuous nodes on the LSP suffer communication failure, as a result, failures of the control plane influence services of the transmission plane.

SUMMARY

Accordingly, the present invention is directed to a failure processing method, capable of recovering a label switched path (LSP) reliably when several nodes on the LSP suffer communication failure.

The present invention provides a method for processing failure, applicable to a LSP including a first node, a second node, and at least one third node. The first node and the second node are adjacent nodes suffering communication breakdown. The first node restarts. The third node is a normal node closest to the restarted first node. The method includes the following steps.

While the communication between the first node and the second node is broken, the third node maintains control state information of the LSP in a certain period of time. The communication between the first node and the second node is still broken after the first node restarts.

After the communication between the first node and the second node is recovered in the certain period of time, the first node, the second node and the third node recover the control state information of the LSP.

The present invention further provides a system for processing failure including a first node, a second node, and at least one third node. The first node and the second node are adjacent nodes suffering communication breakdown. The first node restarts. The third node is a normal node closest to the restarted first node.

The third node is adapted, in a certain period of time, to maintain the control state information of the LSP if the communication between the first node and the second node is broken, wherein the communication between the first node and the second node is still broken after the first node restarts, and the third node is adapted to recover the control state information of the LSP if the communication between the first node and the second node is recovered.

The first node is adapted to recover the control state information of the LSP if the communication between the first node and the second node is recovered. The communication is recovered in the certain period of time.

The second node is adapted to recover the control state information of the LSP if the communication between the first node and the second node is recovered. The communication is recovered in the certain period of time.

The present invention further provides a device along LSP. The LSP transits a first device, a second device and at least one third device. The first device and the second device are adjacent devices suffering communication breakdown. The first device restarts. The third device is a normal device closest to the restarted first device. When the device is the third device, the device includes a first module and a second module.

The first module is adapted to begin counting time when the communication between the first device and the second device is broken, and stop counting time if the communication between the first device and the second device is recovered when counted time does not exceed the certain period of time.

The second module is adapted to maintain control state information of the device if the communication between the first device and the second device is broken when a time counted by the first module does not exceed the certain period of time, and recover the control state information of the device if the communication between the first device and the second device is recovered when the time counted by the first module does not exceed the certain period of time.

Based on the aforementioned technical solutions, by using the method according to the present invention, the LSP may be reliably recovered when several nodes on the LSP have communication failures. More specifically, the present invention has the following advantageous effects.

When communication failures occur among several continuous nodes because a node on the LSP powers off for a long time or a link among the nodes is broken, and the time periods for each node to recover to a normal state are different, the nodes on the LSP may maintain the control state information corresponding to the LSP in the nodes through self-refresh process during the recovery waiting time. Furthermore, if all the nodes having communication failures are recovered to be normal in the recovery waiting time, the unrecovered control state information in the nodes on the LSP is recovered, thereby efficiently protecting the LSP from being deleted abnormally and enhancing the reliability of LSP recovery.

In addition, the present invention can realize quick deletion of LSP under the circumstance that the LSP cannot be recovered due to breakdown failures not belonging to communication, thereby quickly and accurately removing a failed connection, being favorable to quickly release network resources occupied by the LSP, and enhance the utilization rate of the network resources.

DETAILED DESCRIPTION

One or more exemplary embodiments of the invention are described below in detail. The disclosed embodiments are intended to be illustrative only since numerous modifications and variations therein will be apparent to those of ordinary skill in the art.

An embodiment of the present invention provides a failure processing method, in which a normal node in a LSP closest to a restarted node performs self-refresh process on control state information corresponding to the LSP during a recovery waiting time.

Figure 1:
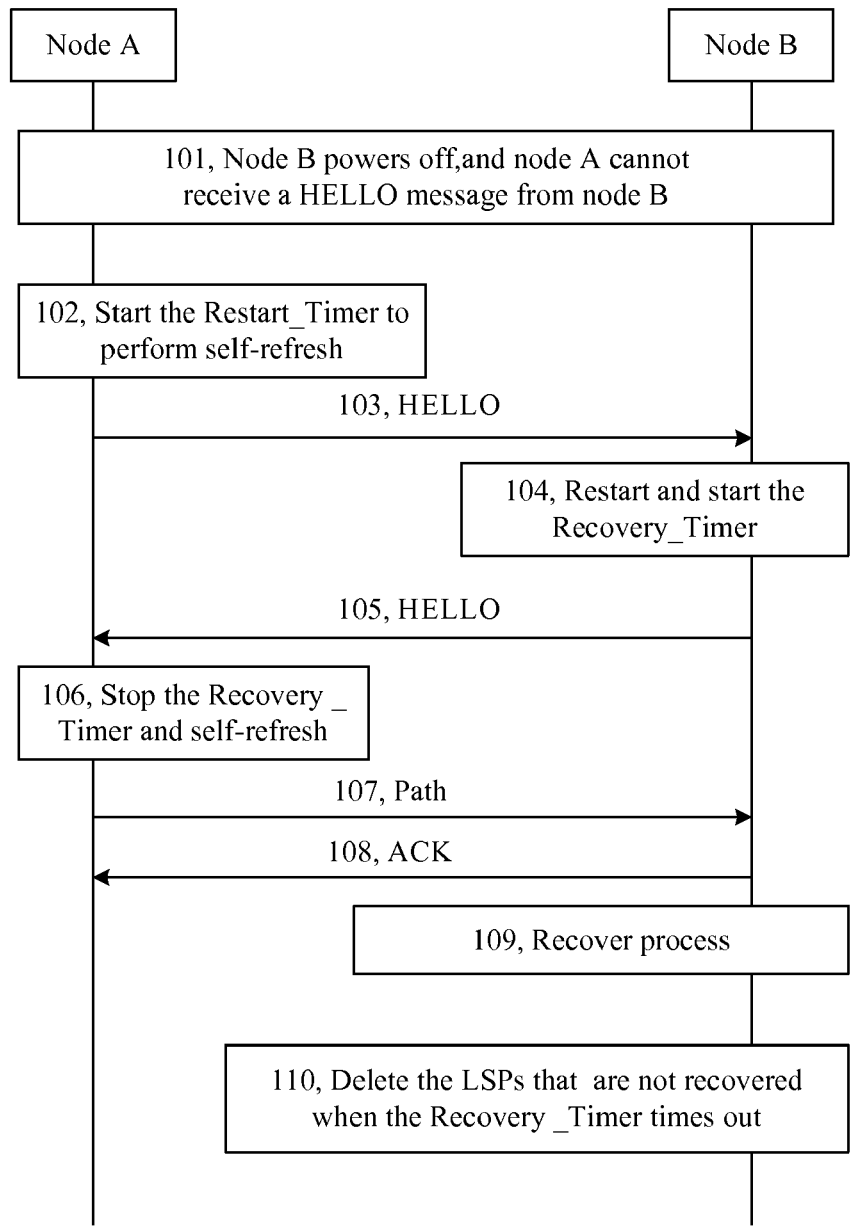
FIG. 1 is a flow chart of a method for processing node restart.
Figure 2:
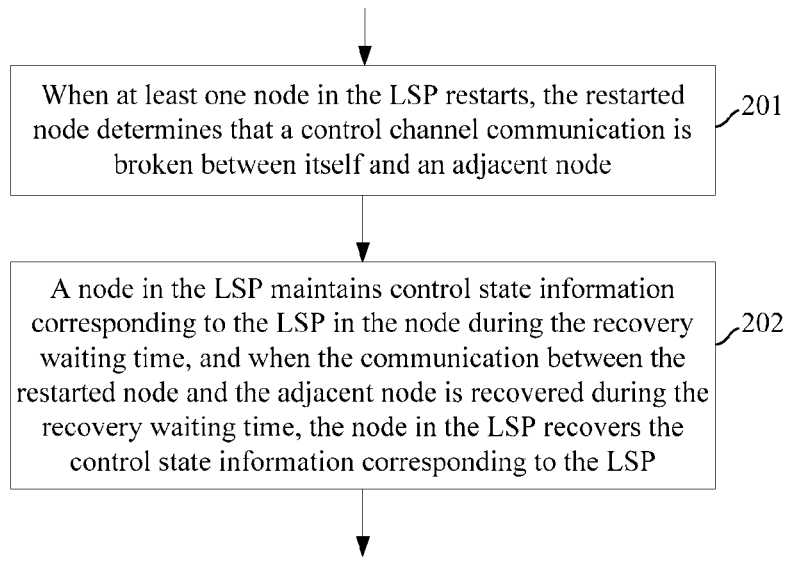
FIG. 2 is an exemplary flow chart of a method for processing failure, according to the present invention.

FIG. 2 is an exemplary flow chart of a method for processing failure, according to the present invention. As shown in FIG. 2, the method includes the following steps.

In Step 201, when at least one node on the LSP restarts, the restarted node determines that the control channel communication is broken between itself and an adjacent node;

In Step 202, a node on the LSP maintains the control state information corresponding to the LSP in the node during the recovery waiting time, and when the communication between the restarted node and the adjacent node is recovered during the recovery waiting time, the node on the LSP recovers the control state information corresponding to the LSP.

In an embodiment of the present invention, if the control channel communication is still broken between the restarted node and the adjacent node after the recovery waiting time, the node on the LSP deletes the control state information corresponding to the LSP.

A method according to an embodiment of the present invention includes the following three processing modes.

In the first mode, after determining that the communication between the restarted node and the adjacent node is broken, the restarted node sends communication breakdown failure information. After receiving the communication breakdown failure information, a normal node on the LSP closest to the restarted node counts time according to the recovery waiting time. During the recovery waiting time, the node on the LSP performs a recovery waiting process by maintaining the control state information corresponding to the LSP, and stops the recovery waiting process and recovers the control state information of the LSP when normal communication between the restarted node and the adjacent node is recovered.

In the second mode, after determining that the communication between the restarted node and the adjacent node is broken, the restarted node sends communication breakdown failure information and counts time according to the recovery waiting time. During the recovery waiting time, the node on the LSP performs a recovery waiting process by maintaining the control state information corresponding to the LSP, and stops the recovery waiting process and recovers the control state information of the LSP when normal communication between the restarted node and the adjacent node is recovered.

In the third mode, after determining that communication between the restarted node and the adjacent node is broken, the restarted node constructs a normal recovery reply message and sends the normal recovery reply message to the normal node on the LSP. Furthermore, the restarted node counts time, according to the recovery waiting time. During the recovery waiting time, the node on the LSP performs a recovery waiting process by maintaining the control state information corresponding to the LSP, and stops the recovery waiting process and recovers the control state information of the LSP when normal communication between the restarted node and the adjacent node is recovered.

Possible causes for the control channel communication between the restarted node and the adjacent node becoming broken are: The adjacent node does not restart after powering off, or a communication link between the restarted node and the adjacent node is broken while the adjacent node operates normally. When the control channel is broken between the restarted node and the adjacent node due to any one of the aforementioned causes, the multi-node failure processing methods according to an embodiment of the present invention have the same operation.

The failure processing method of the present invention is illustrated through five embodiments below by taking the adjacent node of the restarted node not restarting for a long time as an example.

Embodiment 1

Figure 3:
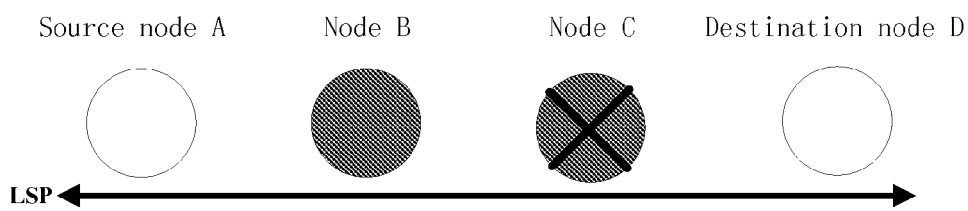
FIG. 3 is a schematic diagram for illustrating operating situations of nodes on an LSP, according to embodiments 1, 2, and 3 of the present invention.

In this embodiment, for example, a LSP passing through nodes A, B, C, and D is illustrated. FIG. 3 shows operating situations of the nodes on the LSP. As shown in FIG. 3, the nodes B and C power off, the node B restarts, and the node C cannot restart for a long time. The node B is a restarted node, the node C is an adjacent node of the node B, the node A is a normal node in an upstream direction closest to the restarted node B, and the node D is a normal node in a downstream direction closest to the restarted node B. According to the first mode, a recovery waiting time is set on a normal node on the LSP closest to the restarted node, i.e., the node A.

Figure 4:
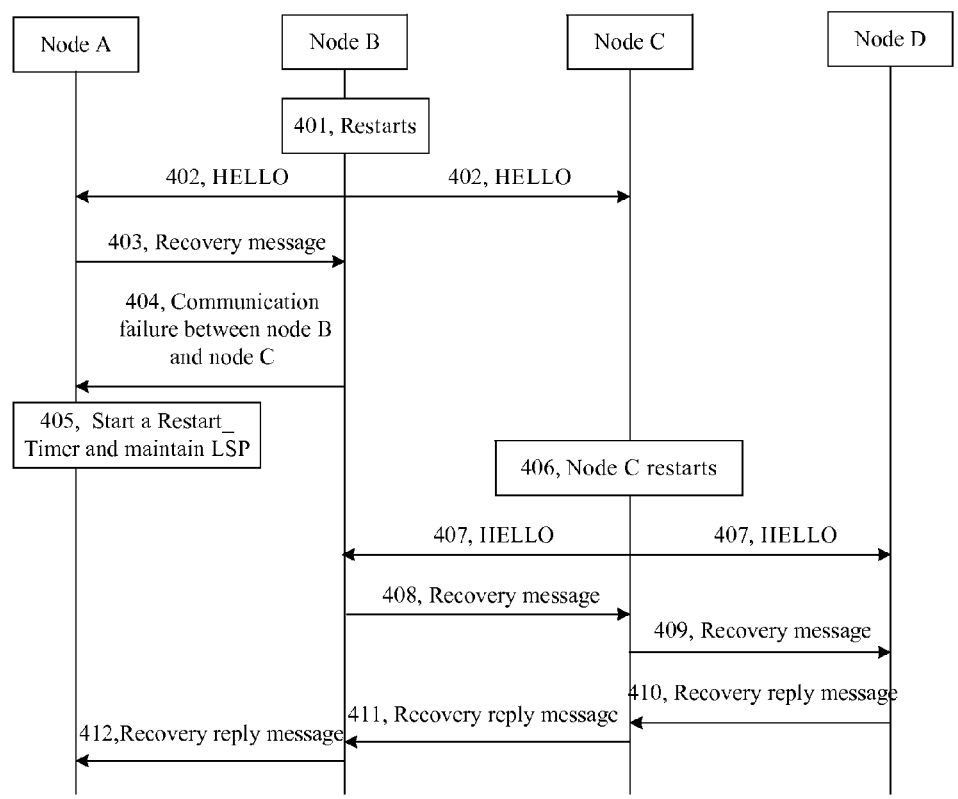
FIG. 4 is a flow chart of a method for processing failure, according to embodiment 1 of the present invention.

FIG. 4 is a flow chart of a method for processing failure in this embodiment. As shown in FIG. 4, the method includes the following steps.

In Steps 401-402, when the node B powers up and restarts, the node B sends a HELLO message to the node A and the node C, and the node B learns through the HELLO message mechanism that the control channel communication is broken between the node B and the node C.

In the HELLO message sent by the node B, a src-instance value is a value +1 before power-off, and a dst-instance value is 0, so as to enable the node A and the node C to learn the restart of the node B.

After sending the HELLO message to the node C, the node B determines that the communication between the node B and the node C is broken due to failing to receive a reply to the HELLO message from the node C. Reasons why the communication between the two nodes is broken may be that the node C powers off and does not restart or that a communication link between the node B and the node C fails.

In Steps 403-404, the node A sends a recovery message to the node B to inform the node B to recover the control state information corresponding to the LSP. The node B, according to the received recovery message, performs recovery operation and informs the node A the communication breakdown failure information between the node B and the node C.

Herein, the node A sends a recovery message to the node B, such as a Path message with a Recovery_label, so that the node B may, according to the received recovery message, establish a PSB and store the state control information carried in the recovery message in the PSB, so as to realize the recovery of the local control state information.

In a normal situation, after finishing the recovery in the PSB, the node B sends a recovery message to the node C. However, since the node C does not restart, a RSB in the node B cannot be recovered according to a normal protocol flow described in RFC3473. Therefore, the node B, along a direction opposite to the direction of receiving the recovery message, informs the node A the communication breakdown failure information between the node B and the node C.

In Step 405, the node A starts a Restart_Timer counting time according to the recovery waiting time, and maintains the control state information in the RSB corresponding to the LSP through a self-refresh process.

The node A, according to the communication breakdown failure information from the node B, determines that the LSP cannot be recovered for the time being, starts the Restart_Timer counting time according to the recovery waiting time, and performs self-refresh process on the control state information in the RSB corresponding to the LSP in the node A as the timer counts time, so as to prevent the RSB from being deleted as the timer corresponding to the RSB times out. Herein, the Restart_Timer may be preset in advance and started in this step, and may also be set and started both in this step.

Furthermore, since the communication between the adjacent node D in the downstream of the node C and the node C is also broken, the node D performs self-refresh process on the control state information corresponding to the LSP before the Restart_Timer in the node D times out. For example, the node D performs the self-refresh process on the PSB corresponding to the LSP in the node D.

In Steps 406-407, the node C restarts before the Restart_Timer in the node A times out, and sends a HELLO message to the nodes B and D to indicate that the node C powers up and restarts.

In Steps 408-412, the node B sends a recovery message to the node C. The node C, after finishing recovery of the control state information, sends a recovery message to the node D. The node D enters a normal refresh process on the control state information. The node D sends a recovery reply message to the node A through the nodes C and B. The node A stops the Restart_Timer and enters a normal refresh process.

After receiving the recovery message, the node C determines whether itself is a destination node of the LSP. If the node C is the destination node, the node C recovers the control state information in the PSB and RSB corresponding to the LSP in the node C, and sends a recovery reply message such as a RESV message to the node B. The node B, according to the received recovery reply message, recovers the RSB corresponding to the LSP in the node B and sends a recovery reply message to the node A. The node A, after receiving the recovery reply message, stops Restart_Timer in itself and begins a normal refresh process on the control state information.

If the node C is not a destination node, the node C recovers the control state information in the PSB corresponding to the LSP in the node C, and forwards a recovery message to the normal node D in the downstream direction. The node D, after receiving the recovery message, synchronizes the PSB corresponding to the LSP through a normal refresh process on the control state information. Then, the node D sends a recovery reply message hop-by-hop along the upstream direction. The node C and the node B receiving the recovery reply message recover the control state information in the RSB corresponding to the LSP. The node A, after receiving the recovery reply message, stops the Restart_Timer and begins the normal refresh process on the control state information.

If the communication between the node B and the node C is broken because a link between the nodes is broken, the node C as the destination node, after receiving the recovery message, recovers its own control state information through normal refresh process.

So far, the flow of processing node failure ends.

It has been described above that the node C restarts before the Restart_Timer in the node A times out. When the counted time of the Restart_Timer reaches a preset recovery waiting time, i.e., after the timer stops counting time, and the node C still does not restart, the node A performs a process of deleting the unrecovered LSP, and sends a message of deleting the LSP. The node B, after receiving the message of deleting the LSP from the node A, deletes the control state information in the node and corresponding to the LSP. The node D deletes the control state information in the node corresponding to the LSP because a local fixed restart time times out. Or, even if the node C restarts after the Restart_Timer set in the node A times out for a certain period of time, the node D will also delete the control state information in the node D corresponding to the LSP for failing to receive the recovery message from the upstream node C for a long time.

In the aforementioned flow, when several continuous nodes on the LSP suffer communication failures, and each node takes different time to recover to be normal, a normal node closest to the restarted node maintains the control state information corresponding to the LSP in the node in the set recovery waiting time. Furthermore, if all the nodes suffering communication failures recover to be normal in the recovery waiting time, the unrecovered control state information in the nodes on the LSP will be recovered, thereby efficiently preventing the LSP from being deleted abnormally, and enhancing reliability of recovering the LSP. If other non-communication failures occur on the LSP, for example, the control state information of the LSP has been deleted from the upstream node, the downstream node will quickly delete the control state information of the LSP in the node, and this embodiment may delete the LSP according to the method described in the protocol RFC3473, thereby quickly and accurately eliminating failure connections, facilitating quick release of the network resources occupied by the LSP, and enhancing the utilization rate of network resources.

Embodiment 2

This embodiment still takes the LSP shown in FIG. 3 as an example. The node B restarts and the node C cannot restart for a long time. Herein, according to the second mode, a recovery waiting time is set on a restarted node, i.e., the node B, and communication breakdown failure information is sent to the node A.

Figure 5:
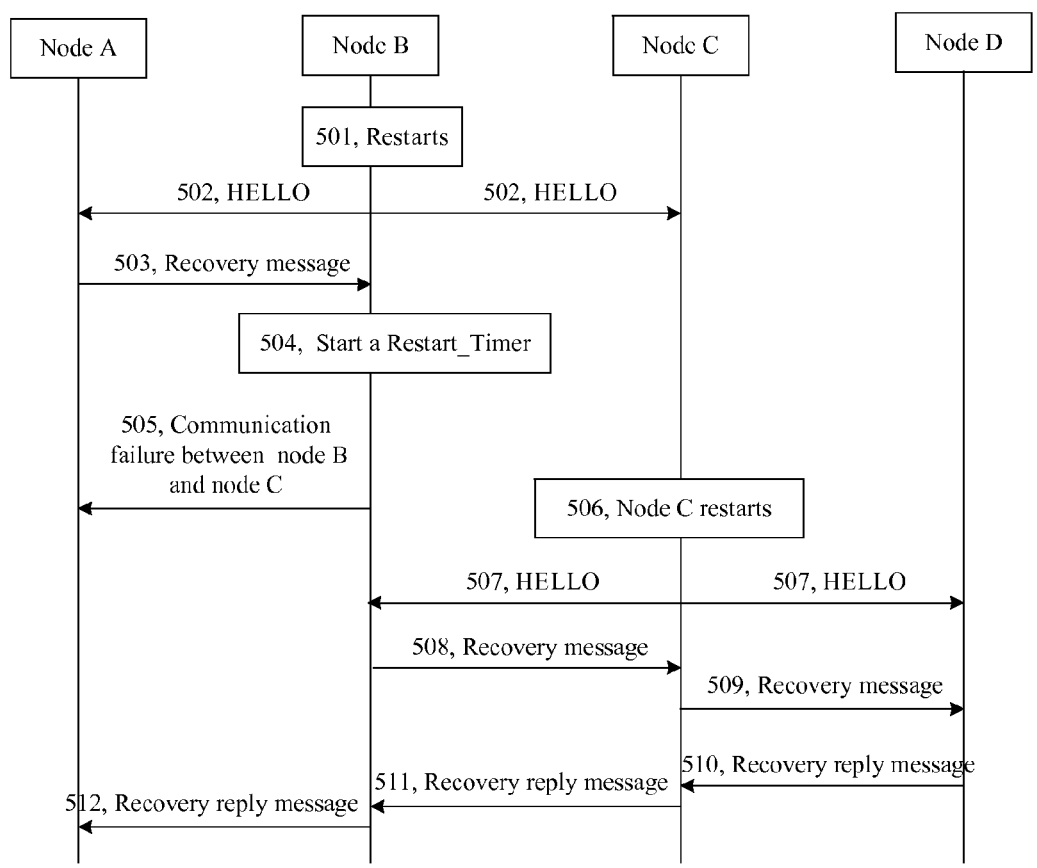
FIG. 5 is a flow chart of a method for processing failure, according to embodiment 2 of the present invention.

FIG. 5 is a flow chart of a method for processing failure in this embodiment. As shown in FIG. 5, the method includes the following steps.

In Steps 501-502, when the node B powers up and restarts, the node B sends a HELLO message to the node A and the node C, and the node B learns through the HELLO message mechanism that the control channel communication is broken between the node B and the node C.

In the HELLO message sent by the node B, a src-instance value is a value +1 before power-off, and a dst-instance value is 0, so as to enable the node A and the node C to learn the restart of the node B.

After sending the HELLO message to the node C, the node B determines that the communication between the node B and the node C is broken for failing to receive a reply to the HELLO message from the node C. Reasons why the communication between the two nodes is broken may lie in not only that the node C powers off and does not restart, but also that a communication link between the node B and the node C fails.

In Steps 503-505, the node A sends a recovery message to the node B to inform the node B to recover the control state information corresponding to the LSP. The node B, according to the received recovery message, performs recovery operation, and then starts a Restart_Timer. Furthermore, the node B informs the node A the communication breakdown failure information between the node B and the node C, and the node A performs self-refresh process on the control state information in the RSB corresponding to the LSP.

Herein, the node A sends a recovery message to the node B, such as a Path message with a Recovery_label, so that the node B may, according to the received recovery message, establish a PSB and store the state control information carried in the recovery message in the PSB, so as to realize the recovery of the local control state information.

Since the node C does not restart, the RSB in the node B cannot be recovered according to the normal protocol flow described in RFC3473, the node B, after finishing the recovery in the PSB, starts the Restart_Timer counting time according to the recovery waiting time, and informs the node A the communication breakdown failure information between the node B and the node C. The node A, after receiving the communication breakdown failure information from the node B, performs self-refresh process on the control state information in the RSB corresponding to the LSP in the node. Herein, the Restart_Timer may be preset in advance and started in this step, and may also be set and started both in this step.

Furthermore, since the communication between the adjacent node D in the downstream of the node C and the node C is also broken, the node D performs self-refresh process on the control state information corresponding to the LSP before the Restart_Timer in the node D times out.

In Steps 506-507, the node C restarts before the Restart_Timer in the node A times out, the node C sends the HELLO message to the nodes B and D to indicate that the node C powers up and restarts.

In Steps 508-512, the node B stops the Restart_Timer, enters a normal refresh process, and sends the recovery message to the node C. The node C, after finishing the recovery of the control state information, sends the recovery message to the node D, and the node D enters the normal refresh process. The node D sends a recovery reply message to the node A through the nodes C and B.

The node B, after learning that the node C restarts through the HELLO mechanism, stops its own Restart_Timer. After receiving the recovery message, the node C determines whether it is a destination node of the LSP. If the node C is the destination node, the node C recovers the control state information in the PSB and RSB corresponding to the LSP in the node C, and sends a recovery reply message such as a RESV message to the node B. The node B, according to the received recovery reply message, recovers the RSB corresponding to the LSP in this node through a normal refresh process on the control state information.

If the node C is not a destination node, the node C recovers the control state information in the PSB corresponding to the LSP in the node C, and forwards a recovery message to the normal node D in the downstream direction. The node D, after receiving the recovery message, synchronizes the PSB corresponding to the LSP through a normal refresh process on the control state information. Then, the node D sends the recovery reply message hop-by-hop along the upstream direction. The node C and the node B receiving the recovery reply message recover the control state information in the RSB corresponding to the LSP. The node A, after receiving the recovery reply message, synchronizes the control state information of its own RSB through a normal refresh process on the control state information.

So far, the flow of processing node failure ends.

It has been described above that the node C restarts before the Restart_Timer in the node B times out. When the counted time of the Restart_Timer reaches a preset recovery waiting time, i.e., after the Restart_Timer stops counting time, and the node C still does not restart, the node B performs a process of deleting the unrecovered LSP in the direction of the node A, and sends a message of deleting the LSP. The node A, after receiving the message of deleting the LSP from the node B, deletes the control state information corresponding to the LSP in the node. The node D deletes the control state information corresponding to the LSP in the node because a local fixed restart time times out. Or, even if the node C restarts after the Restart_Timer set in the node B times out for a while, the node D will also delete the control state information corresponding to the LSP in the node D for failing to receive the recovery message from the upstream node C for a long time.

In the aforementioned flow, when several continuous nodes on the LSP suffer communication failures, and each node takes different time to recover to be normal, a restarted node maintains the control state information in the node corresponding to the LSP in the recovery waiting time. Furthermore, if all the nodes suffering communication failures recover to be normal in the recovery waiting time, the unrecovered control state information in the node corresponding to the LSP will be recovered, thereby efficiently preventing the LSP from being deleted abnormally, and enhancing reliability of recovering the LSP. If other non-communication failures occur on the LSP, this embodiment may quickly delete the LSP according to the method described in the protocol RFC3473, thereby quickly and accurately eliminating failure connections, facilitating quick release of the network resources occupied by the LSP, and enhancing the utilization rate of network resources.

Embodiment 3

This embodiment still takes the LSP shown in FIG. 3 as an example. The node B restarts and the node C cannot restart for a long time. Herein, according to the third mode, a recovery waiting time is set on a restarted node and a normal recovery reply message is constructed and sent to the node A.

Figure 6:
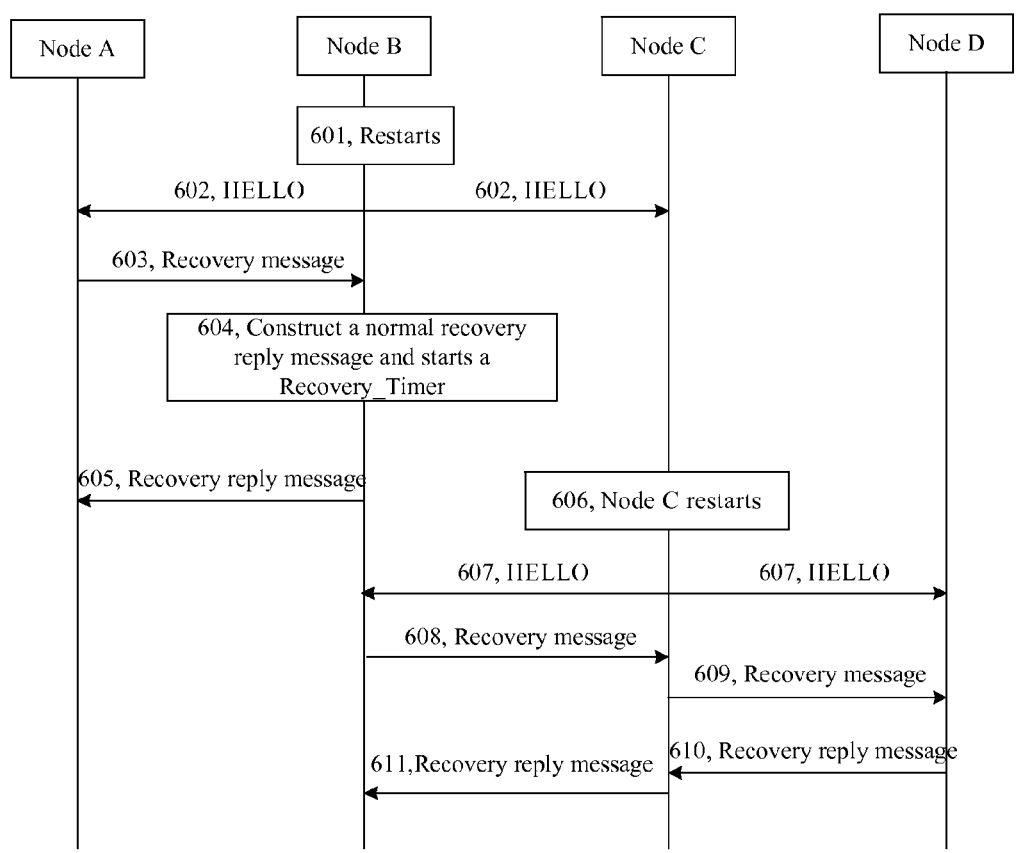
FIG. 6 is a flow chart of a method for processing failure, according to embodiment 3 of the present invention.

FIG. 6 is a flow chart of a method for processing failure in this embodiment. As shown in FIG. 6, the method includes the following steps.

In Steps 601-602, when the node B powers up and restarts, the node B sends a HELLO message to the node A and the node C, and the node B learns through the HELLO message mechanism that the control channel communication between the node B and the node C is broken.

After sending the HELLO message to the node C, the node B determines that the communication between the node B and the node C is broken for failing to receive a reply to the HELLO message from the node C. Reasons why the communication between the two nodes is broken may lie in not only that the node C powers off and does not restart, but also that a communication link between the node B and the node C fails.

In Steps 603-605, the node A sends a recovery message to the node B to inform the node B to recover control state information corresponding to the LSP. The node B, according to the received recovery message, performs the recovery operation. Then, the node B starts the Restart_Timer, and establishes a PSB therein according to the recovery message from the node A and a transmission plane message stored in the node B, and constructs and sends a normal recovery reply message to the node A. The node A, after receiving the recovery reply message, synchronizes the control state information in the RSB corresponding to the LSP through normal refresh process.

Herein, the node A sends a recovery message to the node B, such as a Path message with a Recovery_label, so that the node B may, according to the received recovery message, establish a PSB and store the state control information carried in the recovery message in the PSB, so as to realize the recovery of the local control state information.

Since the node C does not restart, although the RSB in the node B can normally send a refresh message such as a RESV message to an upstream node A, the node B merely stores a part of the control state information in the RSB for failing to receive the refresh message such as the RESV message from the node C. Therefore, the node B, after finishing the recovery in the PSB and a part in the RSB, starts the Restart_Timer counting time according to the recovery waiting time, and performs a self-refresh process on the control state information in the RSB corresponding to the LSP in the node B. Meanwhile, the node B constructs and sends a normal recovery reply message to the node A. Such operation aims that, only the restarted node, i.e., the node B, learns that the communication is broken between itself and the node C, while other normal nodes on the LSP refresh the LSP in a normal manner.

Furthermore, since the communication between the adjacent node D in the downstream of the node C and the node C is also broken, the node D performs self-refresh process on the control state information corresponding to the LSP before the Restart_Timer in the node D times out, for example, performs self-refresh process the PSB corresponding to the LSP in the node D.

In Steps 606-607, the node C restarts before the Restart_Timer in the node B times out, and sends the HELLO message to the nodes B and D to indicate that the node C powers up and restarts.

In Steps 608-611, the node B stops the Restart_Timer, enters a normal refresh process, and sends the recovery message to the node C. The node C, after finishing the recovery of the control state information, sends the recovery message to the node D, and the node D enters the normal refresh process. The node D sends a recovery reply message to the nodes C and B, and the nodes C and B perform recovery according to the reply message.

The node B, after learning that the node C restarts through the HELLO mechanism, stops its own Restart_Timer. After receiving the recovery message, the node C determines whether itself is a destination node of the LSP.

If the node C is the destination node, the node C recovers the control state information in the PSB and RSB corresponding to the LSP in the node C, and sends a recovery reply message such as a RESV message to the node B. The node B, according to the received recovery reply message, recovers the control state information in the RSB corresponding to the LSP in this node through a normal refresh process on the control state information together with the node C.

If the node C is not a destination node, the node C recovers the control state information in the PSB corresponding to the LSP in the node C, and forwards a recovery message to the normal node D in the downstream direction. The node D, after receiving the recovery message, synchronizes the PSB corresponding to the LSP, and begins a normal refresh process on the control state information. Then, the node D sends the recovery reply message hop-by-hop along the upstream direction. The node C receiving the recovery reply message recovers the control state information in the RSB corresponding to the LSP. The node B, after receiving the recovery reply message, recovers its own control state information through a normal refresh process on the control state information between the node B and the node C.

So far, the flow of processing node failure ends.

It has been described above that the node C restarts before the Restart_Timer in the node B times out. When the counted time of the Restart_Timer reaches a preset recovery waiting time, i.e., after the Restart_Timer stops counting time, but the node C still does not restart, the node B performs a process of deleting the unrecovered LSP in the direction of the node A, and sends a message of deleting the LSP to the node A. The node A, after receiving the message of deleting the LSP, deletes the control state information corresponding to the LSP in the node. The node D deletes the control state information corresponding to the LSP in the node because a local fixed restart time times out. Or, even if the node C restarts at a time point after the Restart_Timer set in the node B times out, the node D will also delete the control state information corresponding to the LSP in the node D for failing to receive the recovery message from the upstream node C for a long time.

In the aforementioned flow, when several continuous nodes on the LSP suffer communication failures, and each node takes different time to recover to be normal, a restarted node maintains the control state information corresponding to the LSP in the node in the recovery waiting time. Furthermore, if all the nodes suffering communication failures recover to be normal in the recovery waiting time, the unrecovered control state information in the node corresponding to the LSP will be recovered, thereby efficiently preventing the LSP from being deleted abnormally, and enhancing reliability of recovering the LSP. If other non-communication failures occur on the LSP, this embodiment may quickly delete the LSP according to the method described in the protocol RFC3473, thereby quickly and accurately eliminating failure connections, facilitating quick release of the network resources occupied by the LSP, and enhancing the utilization rate of network resources.

Embodiment 4

Figure 7:
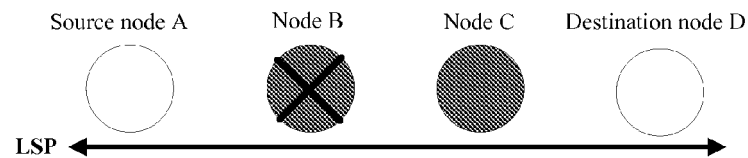
FIG. 7 is a schematic view of operating situations of nodes in a LSP, according to embodiments 4 and 5 of the present invention.

In this embodiment, for example, a LSP passing through nodes A, B, C, and D is illustrated. FIG. 7 shows operating status of the nodes. As shown in FIG. 7, the nodes B and C power off, the node C restarts, and the node B cannot restart for a long time. The node C is a restarted node, the node B is a adjacent node of the node C, the node A is a normal node in an upstream direction closest to the restarted node C, and the node D is a normal node in a downstream direction closest to the restarted node C. According to the first mode, a recovery waiting time is set on a normal node on the LSP closest to the restarted node, i.e., the node D.

Figure 8:
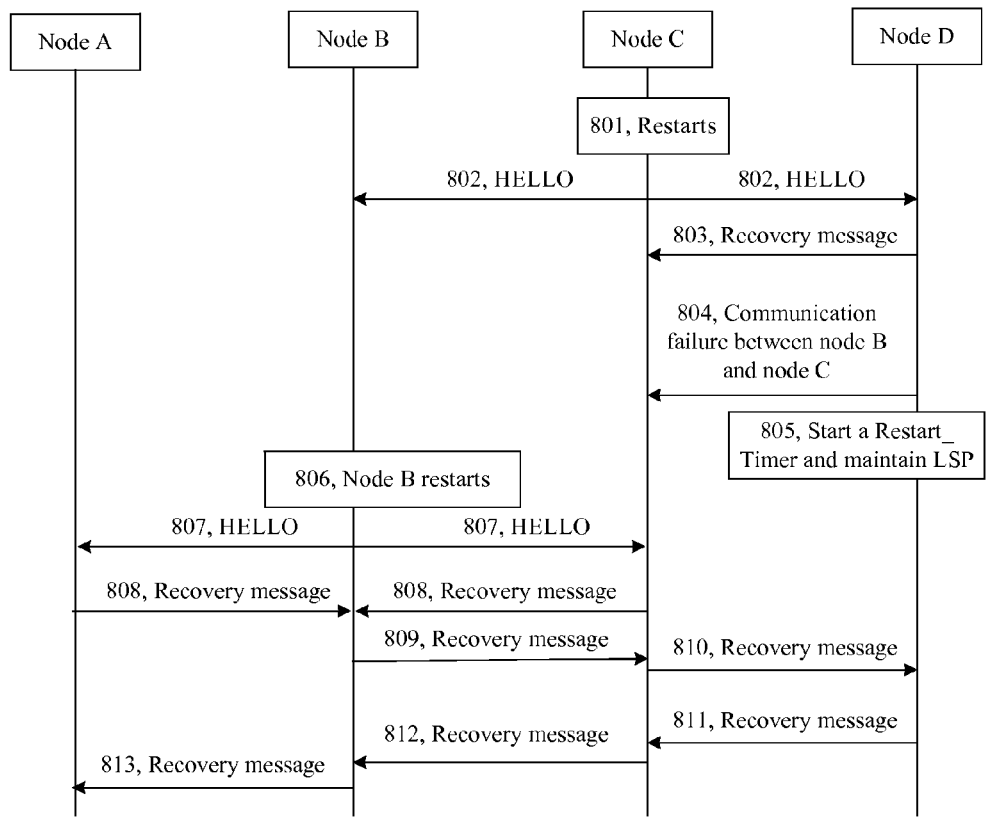
FIG. 8 is a flow chart of a method for processing failure, according to embodiment 4 of the present invention.

FIG. 8 is a flow chart of a method for processing failure in this embodiment. Referring to FIG. 8, the method includes the following steps.

In Steps 801-802, when the node C powers up and restarts, the node C sends a HELLO message to the node B and the node D, and the node C learns through the HELLO message mechanism that the control channel communication is broken between the node C and the node B.

After sending the HELLO message to the node B, the node C determines that the communication between the node B and the node C is broken for failing to receive a reply to the HELLO message from the node B. Reasons why the communication between the two nodes is broken may lie in not only that the node B powers off and does not restart, but also that a communication link between the node B and the node C fails.

In Steps 803-804, the node D sends a recovery message to the node C to inform the node C to recover control state information corresponding to the LSP. The node C, according to the received recovery message, performs recovery operation and informs the node D of the communication breakdown failure information between the node B and the node C.

Herein, the node D sends a recovery message such as a Recovery_Path message. The node C, according to the received recovery message, recovers the control state information in the PSB corresponding to the LSP in the node C. Since the node B does not restart, the node C informs the communication breakdown failure information between the node C and the node B to the node D.

In Step 805, the node D starts a Restart_Timer and performs a self-refresh process on the control state information in the PSB corresponding to the LSP.

The node D, according to the communication breakdown failure information from the node C, determines that the LSP cannot be recovered for the time being, starts the preset Restart_Timer counting time according to the recovery waiting time, and performs self-refresh process on the control state information in the PSB corresponding to the LSP in the node D, so as to prevent the timer corresponding to the PSB from timing out and prevent deleting the PSB. Moreover, since the communication between the adjacent node A in the upstream direction of the node B and the node B is also broken, the self-refresh process is performed on the control state information corresponding to the LSP before the Restart_Timer in the node A times out, for example, the self-refresh process is performed on the RSB corresponding to the LSP in the node A.

In Steps 806-807, the node B restarts before the Restart_Timer in the node D times out, and sends the HELLO message to the nodes A and C to indicate that the node B powers up and restarts.

In Steps 808-813, the node A and the node C both send the recovery message to the node B. The node B, after finishing the recovery of the control state information, sends the recovery message to the node C. The node C, after finishing the synchronization of the control state information, sends the recovery message to the node D. The node D, after receiving the recovery message, stops the Restart_Timer and synchronizes its own control state information through a normal refresh process. The node D sends the recovery reply message to the normal node A in the upstream direction through the node C and the node B.

The node B, after receiving the recovery message from the node C in the downstream direction, determines whether it is a source node of the LSP.

If the node B is the source node, the node B recovers the control state information in the PSB and RSB corresponding to the LSP in the node B, and sends a recovery message such as a Path message with a Recovery_label to the node C. The node C, according to the received recovery message, synchronizes the PSB corresponding to the LSP in this node, and sends the recovery message to the node D. The node D, after receiving the recovery message, synchronizes its own control state information, stops its own Recovery_Timer, and begins a normal refresh process on the control state information.

If the node B is not the source node of the LSP, the node B maintains part of the control state information in the PSB in itself through a normal refresh process in the downstream direction. The node B does not send the recovery message with a Recovery_label such as a Path message to the node C until receiving the recovery message from the node A in the upstream direction. The node C, according to the received recovery message, synchronizes the PSB in the node corresponding to the LSP, and sends the recovery message to the node D. The node D, after receiving the recovery message, synchronizes its own control state information, stops its own Restart_Timer, and begins the normal refresh process on the control state information. The node D sends the recovery reply message such as an RESV message hop-by-hop to the normal node A in the upstream direction through the node C and the node B. The node C and the node B, after receiving the recovery reply message, recovers the control state information of the local RSB. The node A, after receiving the recovery reply message, synchronizes the control state information of the local RSB through the normal refresh process.

So far, the flow of processing node failure ends.

It has been described above that the node B restarts before the Restart_Timer in the node D times out. When the counted time of the Restart_Timer reaches a preset recovery waiting time, i.e., after the timer stops counting time, but the node B still does not restart, the node D performs a process of deleting the unrecovered LSP.

This embodiment is similar to Embodiment 1. When several continuous nodes on the LSP suffer communication failures, and each node takes different time to recover to be normal, the LSP may be efficiently prevented from being deleted abnormally, and reliability of recovering the LSP may be enhanced. If other non-communication failures occur on the LSP, this embodiment may delete the LSP according to the method described in the protocol RFC3473, thereby quickly and accurately eliminating failure connections, facilitating quick release of the network resources occupied by the LSP, and enhancing the utilization rate of network resources.

Embodiment 5

This embodiment still takes the LSP shown in FIG. 7 as an example. The node C restarts, and the node B cannot restart for a long time. Herein, according to the second mode, a recovery waiting time is preset on a restarted node, i.e., the node C.

Figure 9:
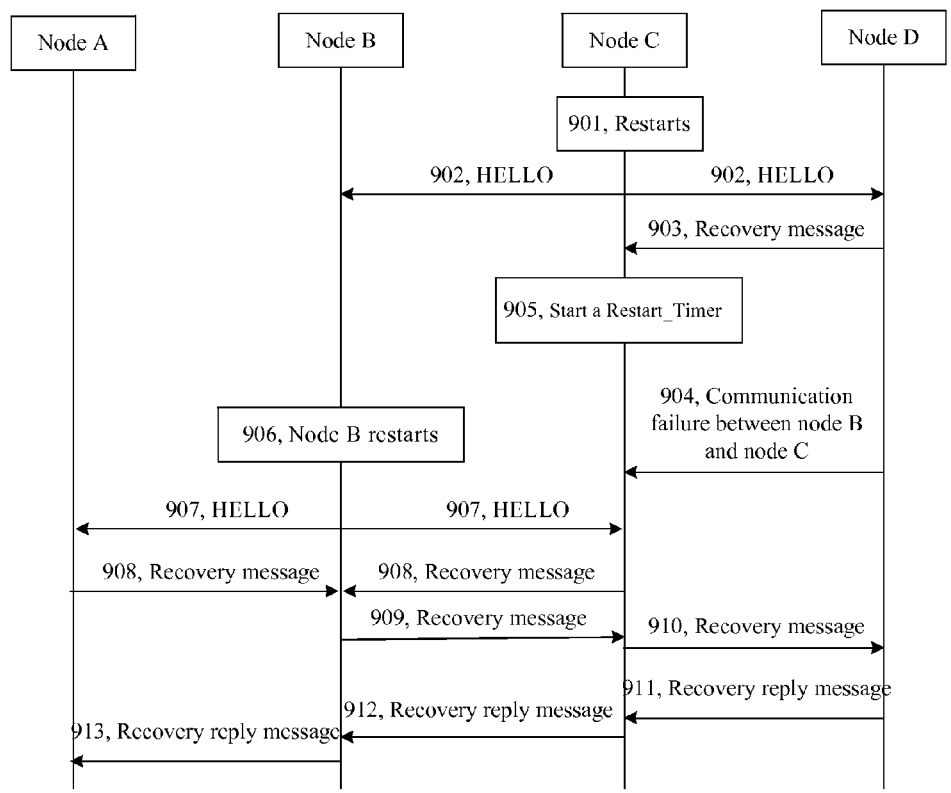
FIG. 9 is a flow chart of a method for processing failure, according to embodiment of the present invention

FIG. 9 is a flow chart of a method for processing failure in this embodiment. Referring to FIG. 9, the method includes the following steps.

In Steps 901-902, when the node C powers up and restarts, the node C sends a HELLO message to the node B and the node D, and the node C learns through the HELLO message mechanism that the control channel communication between the node C and the node B is broken.

In Steps 903-905, the node D sends a recovery message to the node C to inform the node C to recover control state information corresponding to the LSP. The node C, according to the received recovery message, performs recovery operation, and then starts a Restart_Timer. Furthermore, the node C informs the node D of the communication breakdown failure information between the node B and the node C, and the node D performs self-refresh process on the control state information in the RSB corresponding to the LSP.

In Steps 906-907, the node B restarts before the Restart_Timer in the node D times out, the node B sends the HELLO message to the nodes A and C to indicate that the node B powers up and restarts.

In Steps 908-913, the node A and the node C both send the recovery message to the node B. The node B, after finishing the recovery of the control state information, sends the recovery message to the node C. The node C, after finishing the synchronization of the control state information, stops the Restart_Timer, and sends the recovery message to the node D. The node D, after receiving the recovery message, synchronizes its own control state information through a normal refresh process. The node D sends the recovery reply message to the normal node A in the upstream direction through the node C and the node B.

The node B, after receiving the recovery message from the node C in the downstream direction, determines whether it is a source node of the LSP.

If the node B is the source node, the node B recovers the control state information in the PSB and RSB corresponding to the LSP in the node B, and sends a recovery message with a Recovery_label such as a Path message to the node C. The node C, according to the received recovery message, synchronizes the PSB corresponding to the LSP in this node, stops the Restart_Timer, and sends the recovery message to the node D. The node D, after receiving the recovery message, synchronizes its own control state information through a normal refresh process on the control state information.

If the node B is not the source node of the LSP, the node B maintains a part of the control state information in the PSB in this node through a normal refresh process in the downstream direction. The node B will not send the recovery message such as a Path message with a Recovery_label to the node C until receiving the recovery message from the node A in the upstream direction. The node C, according to the received recovery message, synchronizes the PSB corresponding to the LSP in the node, stops the Restart_Timer, and sends the recovery message to the node D. The node D, after receiving the recovery message, synchronizes its own control state information through the normal refresh process on the control state information. The node D sends the recovery reply message such as a RESV message hop-by-hop to the normal node A in the upstream direction through the node C and the node B. The node C and the node B, after receiving the recovery reply message, recovers the control state information of the local RSB. The node A, after receiving the recovery reply message, synchronizes the control state information of the local RSB through the normal refresh process.

So far, the flow of processing node failure ends.

It has been described above that the node B restarts before the Restart_Timer in the node C times out. When the counted time of the Restart_Timer reaches a preset recovery waiting time, i.e. after the timer stops counting time, but the node B still does not restart, the node D deletes the unrecovered LSP.

This embodiment is similar to embodiment 2. When several continuous nodes on the LSP suffer communication failures, and each node takes different time to recover to be normal, the LSP may be efficiently prevented from being deleted abnormally, and reliability of recovering the LSP may be enhanced. If other non-communication failures occur on the LSP, this embodiment may delete the LSP according to the method described in the protocol RFC3473, thereby quickly and accurately eliminating failed connections, facilitating quick release of the network resources occupied by the LSP, and enhancing the utilization rate of network resources.

In addition, if the LSP shown in FIG. 7 is processed by the third mode, the Restart_Timer in the node C counts time. Furthermore, when determining that the communication between the node C and the node B is broken the node C constructs and sends a normal recovery reply message to the node D. Furthermore, after the communication between the node B and the node C is recovered, the recovery is processed according to a method similar to that in embodiment 3. More specifically, the node C, according to the recovery message from a node in the downstream direction and a transmission plane message stored therein, establishes a PSB corresponding to the LSP therein, maintains the control state information in the PSB through the self-refresh process, and constructs and sends a normal recovery reply message to the normal node D on the LSP. The node D, according to the received normal recovery reply message, refreshes the control state information corresponding to the LSP in the node D, and sends a normal refresh message in the direction of the restarted node C. The node C receiving the refresh message recovers the control state information corresponding to the LSP in the node C through the normal refresh process. In the recovery waiting time, if the node C determines that the communication with the node B has been recovered, the node C sends a refresh message to the node B. The node B determines whether itself is a source node of the LSP.

If the node B is the source node, the node B recovers or synchronizes the control state information in the PSB corresponding to the LSP in the node B, and sends a recovery message to the node C. The node C, according to the received recovery message, synchronizes the control state information in the PSB corresponding to the LSP in this node, stops its own Restart_Timer, and sends the refresh message to the node B. The node B receiving the refresh message recovers the control state information in the RSB corresponding to the LSP in this node through a normal refresh process, and the flow ends.

If the node B is not the source node, the node B maintains a part of the control state information in the PSB in this node through a refresh process in the downstream direction. The node B does not send the recovery message such as a Path message with a Recovery_label to the node C until receiving the recovery message from the node A in the upstream direction. The node C, according to the received recovery message, stops its own Restart_Timer, synchronizes the control state information in the PSB corresponding to the LSP in the node, and sends a refresh message to the normal node A in the upstream direction through the node B. The node B receiving the refresh message recovers the control state information in the RSB corresponding to the LSP in the node B. The node A, after receiving the refresh message, synchronizes the control state information in the RSB corresponding to the LSP in the node A through a normal refresh process and the flow ends.

In embodiments 1, 2, 4, and 5, the restarted node, after receiving the recovery message from the adjacent node in the upstream or downstream direction, sends communication breakdown failure information to a normal node. The restarted node may also sends the communication breakdown failure information to the normal node according to the routing information of the LSP recorded in the restarted node in advance after detecting that the communication between and the adjacent node is broken when receiving no recovery message.

In addition, the aforementioned five embodiments all describe the circumstance that communication failures occur when the nodes on the LSP do not restart for a long time. The method according to the ideas of the present invention may be further adapted to the circumstance that the communication link between the nodes is broken to cause communication failures while the restarted node and adjacent node operate normally. Under this circumstance, the restarted node detects that the communication link between the restarted node and the adjacent node is broken through the HELLO message mechanism after restarting. After that, operation may be performed, according to the method disclosed in any abovementioned embodiment.

The embodiments of the present invention provide a system for processing failure, which includes a first node, a second node, and at least one third node. The first node and the second node are adjacent nodes suffering communication breakdown, the first node restarts, and the third node is a normal node closest to the restarted first node.

In the system, the third node is adapted, in a certain period of time, to maintain the control state information of the LSP if the communication between the first node and the second node is broken, and recover the control state information of the LSP if the communication between the first node and the second node is recovered.

The first node is adapted to recover the control state information of the LSP if the communication between the first node and the second node is recovered in the certain period of time.

The second node is adapted to recover the control state information of the LSP if the communication between the first node and the second node is recovered in the certain period of time.

Correspondingly to the failure processing method, the system also provides the following three methods.

In the first mode, the first node is adapted to construct a recovery reply message after receiving the recovery message from the third node, send the recovery reply message to the third node, and begin counting time; and stop counting time if the communication between the first node and the second node is recovered when counted time does not exceed the certain period of time.

The third node is adapted to send the recovery message to the first node, and maintain the control state information of the LSP according to the recovery reply message when counted time does not exceed the certain period of time.

In the second mode, the first node is adapted to send communication breakdown failure information between the first node and the second node.

The third node is adapted to begin counting time after receiving the communication breakdown failure information; maintain the control state information of the LSP if the communication between the first node and the second node is broken when counted time does not exceed the certain period of time; and stop counting time if the communication between the first node and the second node is recovered.

In the third mode, the first node is adapted to send the communication breakdown failure information and begin counting time; and stop counting time if the communication between the first node and the second node is recovered when counted time does not exceed the certain period of time.

The third node is adapted to maintain the control state information of the LSP when counted time does not exceed the certain period of time.

The operation method of the system is similar to the description of the method, and will not be repeated here.

Figure 10:
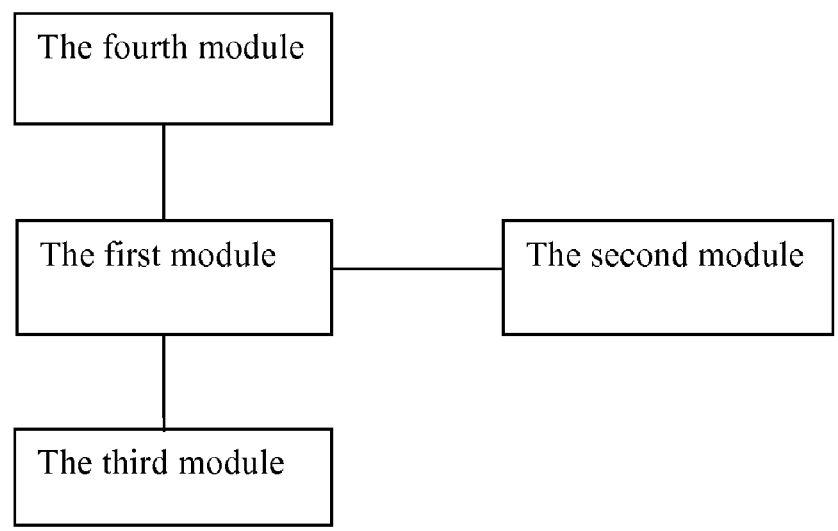
FIG. 10 is a schematic diagram showing the structure of a device along a label switched path (LSP) according to one embodiment of the present invention.

As shown in FIG. 10, the embodiments of the present invention provide a device along a LSP. There are a first device, a second device and at least one third device along the LSP. The first device and the second device are adjacent devices suffering communication breakdown. The first device restarts, and the third device is a normal device closest to the started first device. When the device is the third device, the device includes a first module and a second module.

The first module is adapted to begin counting time when communication between the first device and the second device is broken, and stop counting time if communication between the first device and the second device is recovered when counted time does not exceed a certain period of time.

The second module is adapted to maintain control state information of the device if the communication between the first device and the second device is broken when a time counted by the first module does not exceed the certain period of time, and recover the control state information of the device if the communication between the first device and the second device is recovered.

When the device is the first device, the device further includes a third module.

The third module is adapted to report communication breakdown failure information between the first device and the second device to the third device. The first module is adapted to begin counting time when the third module reports the communication breakdown failure information; and stop counting time if communication between the first device and the second device is recovered when the counted time does not exceed the certain period of time.

When the device is the first device, the device further includes a fourth module.

The fourth module is adapted to construct and return a normal recovery reply message to the third device when the third device sends a recovery message to the first device.

The first module is adapted to begin counting time when the fourth module returns the recovery reply message; and stop counting time if communication between the first device and the second device is recovered when the counted time does not exceed the certain period of time.

According to the method, system, and device described in the aforementioned embodiments, when several continuous nodes on the LSP suffer communication failures, and each node takes different time to recover to be normal, the LSP may be efficiently prevented from being deleted abnormally, and reliability of recovering the LSP may be enhanced. If other non-communication failures occur on the LSP, this embodiment may delete the LSP according to the method described in the protocol RFC3473, thereby quickly and accurately eliminating failure connections, facilitating quick release of the network resources occupied by the LSP, and enhancing the utilization rate of network resources.

Though illustration and description of the present disclosure have been given with reference to exemplary embodiments, it should be appreciated by persons of ordinary skill in the art that various changes in forms and details can be made without departing from the spirit and scope of this disclosure, which are defined by the appended claims.

What is claimed is:

1. A method for processing failure, applicable to a label switched path (LSP) comprising a first node, a second node and at least one third node, wherein the first node and the second node are adjacent nodes suffering communication breakdown, the first node restarts, and the third node is a normal node closest to the first node, and wherein the method comprises:

maintaining, by the third node, control state information of the LSP while communication between the first node and the second node is broken in a certain period of time wherein the communication between the first node and the second node is still broken after the first node restarts;

recovering, by the first node, the second node and the third node, the control state information of the LSP after the communication between the first node and the second node is recovered, wherein the communication is recovered in the certain period of time; and wherein the maintaining the control state information of the LSP comprises:

sending, by the third node, a recovery message to the first node;

constructing and returning, by the first node, a recovery reply message to the third node, and beginning counting time; and maintaining, by the third node, the control state information of the LSP according to the recovery reply message from the first node when counted time does not exceed the certain period of time, wherein if the communication between the first node and the second node is recovered, the first node stops counting time.

2. A method for processing failure, applicable to a label switched path (LSP) comprising a first node, a second node and at least one third node, wherein the first node and the second node are adjacent nodes suffering communication breakdown, the first node restarts, and the third node is a normal node closest to the first node, and wherein the method comprises:

maintaining, by the third node, control state information of the LSP while communication between the first node and the second node is broken in a certain period of time wherein the communication between the first node and the second node is still broken after the first node restarts;

recovering, by the first node, the second node and the third node, the control state information of the LSP after the communication between the first node and the second node is recovered, wherein the communication is recovered in the certain period of time; and wherein the maintaining the control state information of the LSP comprises:

sending, by the first node, communication breakdown failure information to the third node, and beginning counting time; and maintaining, by the third node, the control state information of the LSP when counted time does not exceed the certain period of time, wherein if the communication between the first node and the second node is recovered, the first node stops counting time.

3. A method for processing failure, applicable to a label switched path (LSP) comprising a first node, a second node and at least one third node, wherein the first node and the second node are adjacent nodes suffering communication breakdown, the first node restarts, and the third node is a normal node closest to the first node, and wherein the method comprises:

maintaining, by the third node, control state information of the LSP while communication between the first node and the second node is broken in a certain period of time wherein the communication between the first node and the second node is still broken after the first node restarts;

recovering, by the first node, the second node and the third node, the control state information of the LSP after the communication between the first node and the second node is recovered, wherein the communication is recovered in the certain period of time; and wherein the maintaining the control state information of the LSP comprises:

sending, by the first node, communication breakdown failure information; and counting time, by the third node, when receiving the communication breakdown failure information, maintaining the control state information of the LSP when counted time does not exceed the certain period of time, wherein if the communication between the first node and the second node is recovered, the third node stops counting time and wherein the first node is an upstream node of the second node; the third node comprises a third upstream node, or comprises a third upstream node and a third downstream node, wherein the third upstream node is an upstream node of the first node, and the third downstream node is a downstream node of the second node;

the third upstream node maintains control state information in a reservation state block (RSB) corresponding to the LSP through self-refresh process;

when the counted time does not exceed the certain period of time, if the communication between the first node and the second node is recovered, and the first node sends a recovery message to the second node, the second node determines whether the second node is a destination node of the LSP;

if the second node is the destination node, the second node, according to the received recovery message, recovers control state information in a path state block (PSB) and the RSB corresponding to the LSP of the second node, and sends a recovery reply message to the first node; the first node, according to the received recovery reply message, recovers the control state information in the RSB corresponding to the LSP of the first node, and sends the recovery reply message hop-by-hop to the third upstream node or a source node along an upstream direction, and a node receiving the recovery reply message recovers the control state information in the RSB corresponding to the LSP of the node; and if the second node is not a destination node, the second node, according to the received recovery message, recovers the control state information in the PSB corresponding to the LSP of the second node, and sends the recovery message hop-by-hop to the third downstream node along a downstream direction, a downstream node receiving the recovery message recovers or synchronizes the control state information in the PSB corresponding to the LSP of the downstream node through a normal refresh process, then, the third downstream node sends a recovery reply message hop-by-hop to the third upstream node or the source node along the upstream direction, and the third upstream node or the source node receiving the recovery reply message recovers the control state information in the RSB corresponding to the LSP of the third upstream node or the source node itself.

4. The method according to claim 3, when the third upstream node maintains the control state information in the RSB, the method further comprising:

maintaining, by the third downstream node, the control state information in a PSB corresponding to the LSP through self-refresh process within a fixed restart time of the third downstream node.

5. A method for processing failure, applicable to a label switched path (LSP) comprising a first node, a second node and at least one third node, wherein the first node and the second node are adjacent nodes suffering communication breakdown, the first node restarts, and the third node is a normal node closest to the first node, and wherein the method comprises:

maintaining, by the third node, control state information of the LSP while communication between the first node and the second node is broken in a certain period of time wherein the communication between the first node and the second node is still broken after the first node restarts;

recovering, by the first node, the second node and the third node, the control state information of the LSP after the communication between the first node and the second node is recovered, wherein the communication is recovered in the certain period of time; and wherein the maintaining the control state information of the LSP comprises:

sending, by the first node, communication breakdown failure information; and counting time, by the third node, when receiving the communication breakdown failure information, maintaining the control state information of the LSP when counted time does not exceed the certain period of time, wherein if the communication between the first node and the second node is recovered, the third node stops counting time; and wherein the first node is a downstream node of the second node, the third node comprises a third downstream node, or comprises a third upstream node and the third downstream node, wherein the third downstream node is a downstream node of the first node, and the third upstream node is an upstream mode of the second node;

the third downstream node maintains the control state information in a PSB corresponding to the LSP through self-refresh;

when counted time does not exceed the certain time, if the communication between the first node and the second node is recovered and the first node sends a recovery message to the second node, the second node determines whether the second node is a source node of the LSP;

if the second node is the source node, the second node, according to the received recovery message, recovers the control state information in a PSB and/or an RSB corresponding to the LSP in the second node, and the second node sends the recovery message hop-by-hop to the third downstream node along a downstream direction; the third downstream node recovers or synchronizes control state information of the third downstream node, and sends a recovery reply message hop-by-hop to the second node along an upstream direction, a node receiving the recovery reply message recovers or synchronizes the control state information in an RSB corresponding to the LSP in the node through a normal refresh process; and if the second node is not the source node, after receiving a recovery message from the third upstream node, the second node, according to the recovery message, recovers control state information in a PSB corresponding to an LSP in the second node, and sends the recovery message hop-by-hop to the third downstream node along a downstream direction; the third downstream node recovers or synchronizes control state information of the third downstream node, and sends a recovery reply message hop-by-hop to the third upstream node along an upstream direction, an upstream node receiving the recovery reply message recovers or synchronizes the control state information in an RSB corresponding to an LSP in the upstream node through a normal refresh process.

6. The method according to claim 5, when the third downstream node maintains the control state information in the PSB, the method further comprising:

maintaining, by the third upstream node, the control state information in the RSB corresponding to the LSP through self-refresh process within a fixed restart time of the third upstream node.

7. The method according to claim 1, wherein the first node is an upstream node of the second node; the third node comprises a third upstream node, or comprises a third upstream node and a third downstream node, wherein the third upstream node is an upstream node of the first node, and the third downstream node is a downstream node of the second node;

when counted time does not exceed the certain period of time, if the communication between the first node and the second node is broken, the first node, according to a recovery message sent from the third upstream node and a transmission plane information stored in the first node, creates a PSB corresponding to the LSP in the first node, maintains control state information in the PSB through self-refresh, and sends a constructed recovery reply message to the third upstream node; the third upstream node, according to the received recovery reply message, maintains control state information corresponding to an LSP in the third upstream node;

when counted time does not exceed the certain period of time, if the communication between the first node and the second node is recovered and the second node receives the recovery message from the first node, the second node determines whether it is a destination node of the LSP;

if the second node is the destination node, the second node recovers control state information in a PSB and an RSB corresponding to an LSP in the second node, and sends a recovery reply message to the first node; the first node, receiving the recovery reply message, recovers control state information in an RSB corresponding to an LSP in the first node, and the first node and the second node enter a normal refresh process; and if the second node is not the destination node, the second node, according to the received recovery message, recovers control state information in an PSB corresponding to an LSP in the second node, and sends the recovery message hop-by-hop to the third downstream node along a downstream direction, a node receiving the recovery message recovers control state information in a PSB corresponding to an LSP in the node, through a normal refresh process; and the third downstream node sends a recovery reply message hop-by-hop to the third upstream node or a source node along an upstream direction, and a node receiving the recovery reply message recovers or synchronizes control state information in an RSB corresponding to an LSP in the node through a normal refresh process.

8. The method according to claim 1, wherein the first node is a downstream node of the second node, the third node comprises a third downstream node, or comprises a third upstream node and the third downstream node, wherein the third upstream node is an upstream node of the second node, and the third downstream node is a downstream node of the first node;

when counted time does not exceed the certain period of time, if the communication between the first node and the second node is broken, the first node, according to a recovery message sent from the third downstream node and a transmission plane message stored in the first node, creates a PSB corresponding to an LSP in the first node, maintains control state information in the PSB through self-refresh, and sends a recovery reply message to the third downstream node; the third downstream node, according to the received recovery reply message, synchronizes control state information corresponding to an LSP in the third downstream node;

when counted time does not exceed the certain period of time, if the communication between the first node and the second node is recovered and the first node sends the recovery message to the second node, the second node determines whether the second node is a source node of the LSP;

if the second node is the source node, the second node, according to the received recovery message, recovers or synchronizes control state information in a PSB and/or a RSB corresponding to an LSP in the second node, and sends the recovery message to the first node, the first node receiving the recovery message recovers control state information in a PSB corresponding to an LSP in the first node, and sends a recovery reply message to the second node, the second node receiving the recovery reply message recovers control state information in a RSB corresponding to the LSP in the second node through a normal refresh process; and if the second node is not the source node, the second node, according to a recovery message from the third upstream node, recovers control state information in a PSB corresponding to the LSP in the second node, and sends the recovery message to the first node, the first node receiving the recovery message recovers control state information in a PSB corresponding to an LSP in the first node, and sends a recovery reply message to the second node, the second node receiving the recovery reply message recovers or synchronizes control state information in an RSB corresponding to the LSP in the second node through a normal refresh process.

9. The method according to claim 2, wherein the first node and the second node are in a communication breakdown states comprises: the second node does not restart or a communication link between the first node and the second node is broken.

10. The method according to claim 2, after the third node maintains the control state information of the LSP in the certain period of time, the method further comprising:

deleting, by the first node and the third node, the control state information corresponding to the LSP if the first node and the second node are still in a control channel breakdown state after the period of time.

11. A system for processing failure—comprising a first node, a second node and at least one third node, the first node and the second node being adjacent nodes suffering communication breakdown, the first node restarting, the third node being a normal node closest to the restarted first node, wherein, the third node is adapted to maintain the control state information of the LSP if the communication between the first node and the second node is broken, wherein the communication between the first node and the second node is still broken after the first node restarts, and the third node is adapted to recover the control state information of the LSP if the communication between the first node and the second node is recovered, wherein the communication is recovered in a certain period of time;

the first node is adapted to recover the control state information of the LSP if the communication between the first node and the second node is recovered;

the second node is adapted to recover the control state information of the LSP if the communication between the first node and the second node is recovered; wherein:

the first node is further adapted to construct a recovery reply message after receiving a recovery message from the third node, send the recovery reply message to the third node, and begin counting time; and stop counting time if communication between the first node and the second node is recovered when counted time does not exceed the certain period of time;

the third node is further adapted to send the recovery message to the first node, and maintain control state information of the LSP according to the recovery reply message when counted time does not exceed the certain period of time.

12. The system according to claim 11, wherein:
the first node is further adapted to send communication breakdown failure information between the first node and the second node;
the third node is further adapted to begin counting time when receiving the communication breakdown failure information; maintain control state information of the LSP if communication between the first node and the second node is broken when counted time does not exceed the certain period of time; and stop counting time if communication between the first node and the second node is recovered.

13. A system for processing failure, comprising a first node, a second node and at least one third node, the first node and the second node being adjacent nodes suffering communication breakdown, the first node restarting, the third node being a normal node closest to the restarted first node, wherein, the third node is adapted to maintain the control state information of the LSP if the communication between the first node and the second node is broken, wherein the communication between the first node and the second node is still broken after the first node restarts, and the third node is adapted to recover the control state information of the LSP if the communication between the first node and the second node is recovered, wherein the communication is recovered in a certain period of time;

the first node is adapted to recover the control state information of the LSP if the communication between the first node and the second node is recovered;

the second node is adapted to recover the control state information of the LSP if the communication between the first node and the second node is recovered;

wherein:

the first node is further adapted to send communication breakdown failure information and begin counting time; and stop counting time if communication between the first node and the second node is recovered when counted time does not exceed the certain period of time;

the third node is further adapted to maintain control state information of the LSP when counted time does not exceed the certain period of time.

* * * * *